United States Patent [19]

Gerkema et al.

[11] Patent Number: 4,614,445

[45] Date of Patent: Sep. 30, 1986

[54] METAL-LUBRICATED HELICAL-GROOVE BEARING COMPRISING AN ANTI-WETTING LAYER

[75] Inventors: Jan Gerkema; Jozef B. Pelzer, both of Eindhoven, Netherlands

[73] Assignee: U.S. Philips Corporation, New York, N.Y.

[21] Appl. No.: 667,944

[22] Filed: Nov. 2, 1984

[30] Foreign Application Priority Data

Nov. 8, 1983 [NL] Netherlands ........................ 8303833

[51] Int. Cl.[4] ...................... F16C 33/10; F16C 33/72; F16C 33/12

[52] U.S. Cl. .................................... 384/368; 384/132; 384/292; 384/912

[58] Field of Search ............... 384/132, 133, 280, 286, 384/291, 292, 276, 322, 368, 371, 448, 912; 308/DIG. 8, 1 R; 184/109, 6.18

[56] References Cited

U.S. PATENT DOCUMENTS

| | | | |
|---|---|---|---|
| 2,242,101 | 5/1941 | Atlee | 308/DIG. 8 |
| 2,980,475 | 4/1961 | Wolfe | 384/292 X |
| 3,207,563 | 9/1965 | Muijderman | 384/371 |
| 3,297,552 | 1/1967 | Gisser et al. | 308/DIG. 8 |
| 3,535,007 | 10/1970 | Klingler et al. | 384/276 X |
| 3,709,324 | 1/1973 | Iwasawa | 308/1 R X |
| 4,097,759 | 6/1978 | Furbee et al. | 308/DIG. 8 |
| 4,210,371 | 7/1980 | Gerkema et al. | 308/DIG. 8 |

FOREIGN PATENT DOCUMENTS

| | | | |
|---|---|---|---|
| 876298 | 8/1961 | United Kingdom | 384/912 |
| 1023007 | 3/1966 | United Kingdom | 308/DIG. 8 |
| 1311854 | 3/1973 | United Kingdom | 308/DIG. 8 |

*Primary Examiner*—Stuart S. Levy
*Assistant Examiner*—Thomas R. Hannon
*Attorney, Agent, or Firm*—David R. Treacy

[57] ABSTRACT

In order to prevent the escape of metal lubricant in a helical-groove bearing, the helical-groove bearing is provided with an anti-wetting layer on the surfaces which adjoin the helically grooved surfaces and which could act as a creepage path for the metal lubricant. An extremely accurate definition of the bearing portions to be wetted by the lubricant is also obtained by means of these layers. Thus, more complex bearings can also be locally provided with a metal lubricant.

15 Claims, 1 Drawing Figure

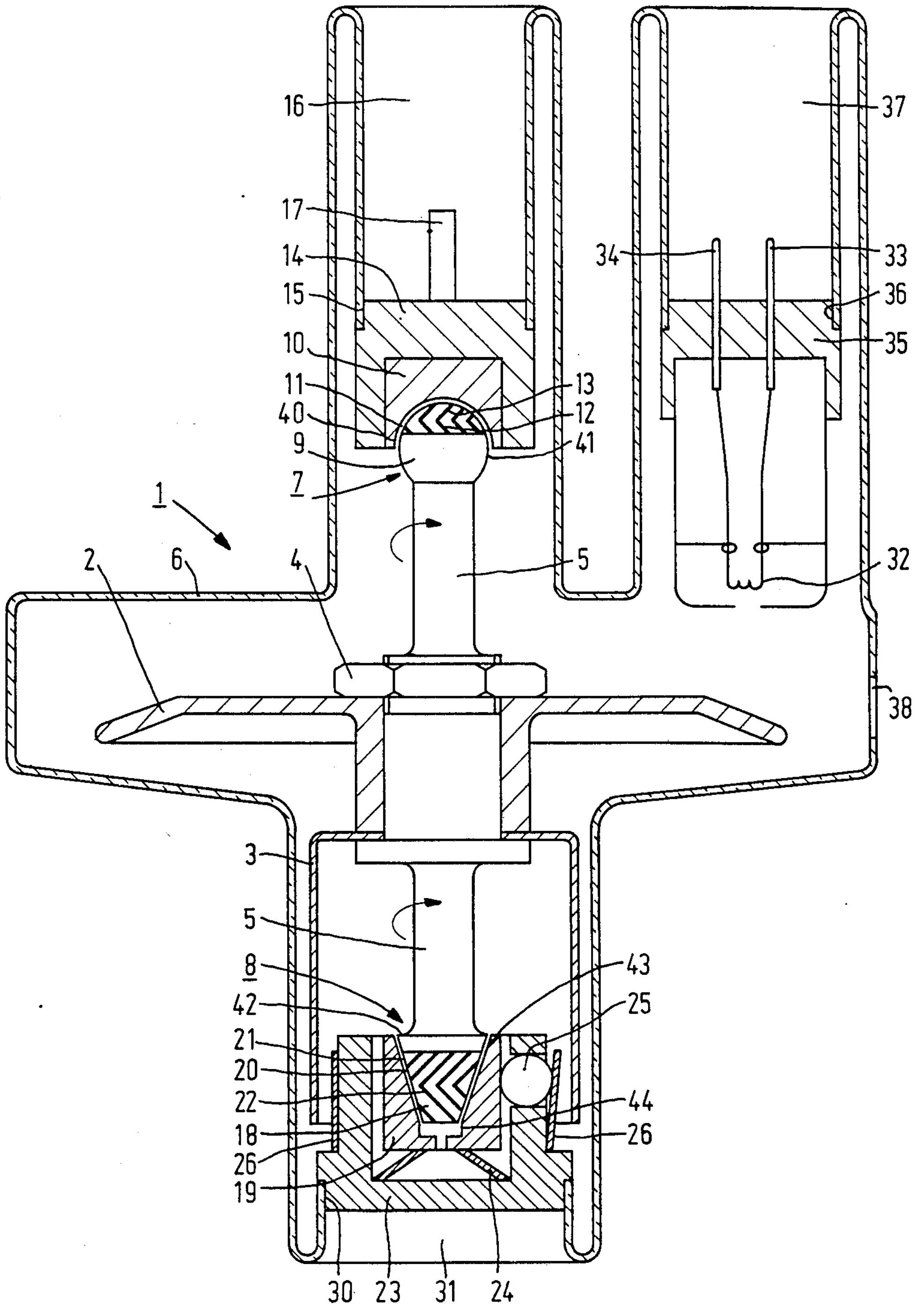
16
37
17
14
15
10
11
40
9
7
13
12
41
34
33
36
35
1
2
6
4
5
32
38
3
5
8
42
21
20
22
18
26
19
43
25
44
26
30
23
31
24

METAL-LUBRICATED HELICAL-GROOVE BEARING COMPRISING AN ANTI-WETTING LAYER

The invention relates to a device comprising a helical-groove bearing with a liquid metal lubricant.

A device of this kind is known from U.S. Pat. No. 4,210,371 in the form of an X-ray tube comprising a rotary anode which is rotatable in a metal-lubricated helical-groove bearing. In this known device the lubricant used in the helical-groove bearing is Ga or a Ga alloy. In bearings of this kind the lubricant may also wet the surfaces adjoining the helically grooved surfaces, so that this lubricant is lost so far as its lubricating function is concerned, and furthermore, in the case of aggressive lubricants such as those containing Ga, corrosion can occur at these surfaces. Anti-wetting layers must often be capable of withstanding the reducing treatment to which the bearing parts are often subjected in order to achieve suitable wetting by the lubricant.

It is the object of the invention to mitigate these drawbacks. To this end, a device of the kind set forth is provided wherein surface areas of the bearing which adjoin the bearing surfaces and which could form a part of a creepage path for the lubricant are locally provided with an anti-wetting layer for repelling the metal lubricant. It has been found that such an anti-wetting layer allows for suitably defined local wetting by the metal lubricant to be used and prevents the escape of lubricant via adjoining surfaces.

It has been found that an anti-wetting layer which consists mainly of titanium oxide obtained by a reducing treatment can withstand a reducing treatment of the bearing parts by heating in a hydrogen atmosphere and results in a strongly adhesive titanium oxide layer which completely prevents the escape of lubricant from the bearing, even when the bearing operates at comparatively high temperatures.

Such a layer can be deposited for example by coating the surfaces to be treated with a layer of a material which consists of a solution of titanium acetylacetonate in isopropanol. Such coating can be realised, for example by using techniques known for the deposition of comparatively thin layers. By a suitable choice of the concentration of the solution the viscosity of the mixture to be applied can be adapted to the method of deposition as well as to the structure of the surface to be coated. A suitable concentration for the coating of tungsten or molybdenum surfaces is between 1 part titanium acetylacetonate in from 5 to 10 parts of isopropanol. In order to achieve suitable adhesion and a homogeneous distribution, a layer consisting of such a solution can be deposited on the relevant surfaces in a number of successive sub-layers, each of which is fired at a temperature of approximately 300° C. in order to form the titanium oxide layer on the surfaces.

Some preferred embodiments of the invention will be described in detail hereinafter with reference to the drawing. The single FIGURE of the drawing shows in sectional elevation an X-ray source 1 which comprises a rotary anode 2 which together with the rotor 3 is secured, by means of a nut 4, on a shaft 5 rotatably journalled in a vacuum-tight housing 6 by means of two bearings 7 and 8. The bearing 7 has a spherical portion 9 which is rigidly connected to the shaft 5 and is accommodated in a spherically recessed supporting member 10. The surfaces of the spherical portion 9 and the supporting member 10 which are situated at opposite sides of a bearing gap 11 form bearing surfaces of the bearing 7. The bearing gap 11 is filled, for example with a metal lubricant which contains Ga and which molecularly wets the bearing surfaces of the bearing portions 9 and 10, which in this case are made of molybdenum or tungsten. This wetting is so intense that these surfaces are completely separated from one another in the described application, even in the loaded condition. The spherical portion 9 is provided with a pattern of helical grooves 12 which force the lubricant in the direction of the apex of the sphere upon rotation of the shaft 5. The spherical portion 9 is furthermore provided with a second pattern of helical grooves 13 which are oppositely orientated to the grooves 12 and thus force lubricant in the opposite direction. As a result of these helical-groove patterns, the bearing 7 has, in addition to an extra high load-bearing capacity in the radial direction, a high dynamic stability upon rotation. The supporting member 10 is mounted in a cylindrical structural member 14 which is secured by means of a vaccum-tight connection 15 in a bowl-shaped recess 16 in the housing 6. The structural member 14 carries a contact 17 for applying the tube current and for dissipating part of the heat developed in the anode during operation.

The bearing 8 consists of a conical portion 18 which is rigidly connected to the shaft 5 and is disposed in a conically recessed supporting member 19. The surfaces of the conical portion 18 and the supporting member 19 which are situated at opposite sides of a bearing gap 20 form the bearing surfaces of the bearing 8. The bearing gap 20 is also filled with a metal lubricant which contains Ga and which molecularly wets the molybdenum or tungsten bearing surfaces of the bearing portions 18 and 19. Like the spherical portion 9, the conical portion 18 comprises two patterns of helical grooves 21 and 22 which force the lubricant into the bearing gap 20 in opposite directions. As a result, the bearing 8 also has, in addition to an extra high load-carrying capacity in the radial and axial directions, a high dynamic stability. The supporting member 19 is resiliently supported in a cylindrical structural member 23, in the axial direction by means of a cup spring 24 and in the radial direction by means of steel balls 25 and a spring member 26. The structural member 23 is secured in a bowl-shaped recesses 31 in the housing 6 by means of a vacuum-tight connection 30.

Anti-wetting layers 40 and 41 protect all surface areas of the bearing 7 which adjoin the helical-groove pattern of the bearing against wetting by the metal lubricant. Similarly, anti-wetting layers 42 and 43 and an anti-wetting layer 44 protect all surface areas of the bearing 9 which adjoin the helical-groove patterns of the bearing against wetting by the material of the metal lubricant. These anti-wetting layers are deposited on the relevant surfaces in the form of a solution of titanium acetylacetonate in isopropanol which consists of, for example 1 part titanium acetylacetonate in 7.5 parts isopropanol, followed by firing, for example, for 5 minutes at 300° C. Thus, a layer is formed which consists mainly of titanium oxide. Subsequently, the metal lubricant is applied after which some further reduction of the titanium oxide occurs; however, the main constituent of the layer remains titanium oxide. When the bearing is wetted by the metal lubricant, the layer will not be destructively attacked and will not be wetted by the lubricant. Creepage will not occur either, that is to say, no metal lubricant will creep between the surfaces of the coated parts and the titanium oxide layer. Thus, exactly defined, local wetting of bearing surfaces by the lubricant can be achieved. The anti-wetting layer has a thickness of approximately 0.5 μm upon completion of all treatments and exhibits an extremely firm adhesion to the subjacent material. The lubricant which is forced inwards by the operation of the bearings will not escape via the adjoining surfaces by creepage. This results in a longer life of the bearings and prevents attack of surfaces outside the bearing by the lubricant. In order to preclude the occurrence of open spots in the anti-wetting layer, the titanium acetylacetonate is preferably deposited in a plurality of steps. For the deposition of the layer it may be advantageous to mark the grooved surface portions. It has been found that no material can creep between the bearing surface and the mask via the boundary surface and the migration of anti-wetting material onto the grooved surface portions can thus be prevented. Considering the fact that this material is not removed by the reducing treatment, this aspect is very important for suitable definition of a surface to be wetted.

A metal lubricant containing a Ga, In, Sn alloy is already liquid at approximately 5° C. It is a drawback, however, that when this lubricant is used, the relevant bearing portions must be made of tungsten or molybdenum because other materials, and even molybdenum to some extent, are attacked by Ga at higher temperatures. A titanium oxide layer is very effective as an anti-wetting layer in such bearings.

When a lubricant is used which consists of a Pb, In, Bi, Sn alloy which becomes liquid at approximately 60° C., molybdenum can also be used at higher temperatures. In that case a titanium oxide layer is again very effective as an anti-wetting layer.

When a Pb, In, Bi metal lubricant is used which becomes liquid only at approximately 110° C., steel can be used as the construction material; this makes the bearings substantially cheaper. It has again been found that a titanium oxide layer is a good anti-wetting layer in that case.

The invention has been described with reference to a rotary anode X-ray tube, in which it can be used to great advantage. However, the invention can also be used in other apparatus such as, for example, microwave tubes or other apparatus in which a bearing must operate in specific, conditioned circumstances, notably in vacuum. The method of deposition of the anti-wetting layer permits very well-defined local deposition, so that comparatively complex surfaces areas, small transitions, edges and the like can also be treated in a suitably defined manner. In combination with, for example, the wetting of the uncoated bearing surfaces by immersion, comparatively complex bearings can also be locally wetted without leaving the wetting medium behind in undesired locations.

What is claimed is:

1. In a device comprising a helical-groove bearing having bearing surfaces and a liquid metal lubricant, and surface areas adjoining said bearing surfaces, the improvement wherein said surface areas of the bearing, which could form a part of a creepage path for the lubricant, are locally provided with an anti-wetting layer consisting mainly of titanium oxide for repelling the metal lubricant.

2. A device as claimed in claim 1, wherein the lubricant contains a Ga, In, Sn alloy.

3. A device as claimed in claim 1, wherein the titanium oxide is deposited in the form of titanium acetylacetonate dissolved in isopropanol, and is subsequently reduced.

4. A device as claimed in claim 1, wherein the helical-groove bearing forms part of an X-ray tube which comprises a rotary anode which rotates in said bearing.

5. A device as claimed in claim 1, wherein the helical-groove bearing forms part of a microwave tube comprising an electrode which rotates in said bearing.

6. In a device including an evacuated housing, a shaft within said housing, bearing means for rotatably supporting said shaft and including a helically grooved bearing surface on said shaft, a bearing seat mounted in said housing, and a liquid metal lubricant between said bearing surface and the bearing seat, said bearing seat and bearing surface being wettable by said lubricant, said shaft having a surface wettable by said lubricant adjoining said bearing surface, the improvement comprising a layer on said adjoining surface of a material that is not wettable by said lubricant, said layer consisting mainly of titanium oxide, whereby said layer inhibits escape of said lubricant from said bearing surface.

7. The device of claim 6 wherein said bearing means further comprises a further surface wettable by said lubricant adjoining said bearing seat, and a layer on said further surface of a material that is not wettable by said lubricant, said layer on said further surface consisting mainly of titanium oxide, whereby said layer on said further surface inhibits escape of said lubricant from said bearing seat.

8. The device of claim 6 wherein said bearing surface is of molybdenum or tungsten.

9. The device of claim 8 wherein said lubricant includes Ga.

10. The device of claim 8 wherein said lubricant is a Ga alloy.

11. The device of claim 6 wherein said lubricant contains a Ga, In, Sn alloy, and said bearing surface is of tungsten or molybdenum.

12. The device of claim 6 wherein said lubricant consists of a Pb, In, Bi, Sn alloy, and said bearing surface is of molybdenum.

13. The device of claim 6 wherein said lubricant comprises a Pb, In, Bi metal lubricant, and said bearing surface is of steel.

14. The device of claim 6 wherein said bearing surface is conical.

15. The device of claim 6 wherein said bearing surface is spherical.

* * * * *